United States Patent Office 2,731,419
Patented Jan. 17, 1956

2,731,419

FERROELECTRIC CERAMIC COMPOSITION

Gilbert Goodman, Albany, N. Y., assignor to General Electric Company, a corporation of New York No Drawing. Application August 12, 1954, Serial No. 449,507

15 Claims. (Cl. 252—62.9)

My invention relates to polycrystalline dielectric materials and, more particularly, to ceramic materials consisting of modified lead metaniobates which are capable of being electrically activated to exhibit remanent piezoelectric properties.

Such polarizable polycrystalline dielectric materials have been found to have electric polarization properties analogous to the magnetic induction properties of ferromagnetic materials and are now generally known as "ferroelectric materials."

One property of these ferroelectric materials is that at a particular temperature called the "Curie point," there is a definite transformation of the crystal structure. Ferroelectric ceramic materials heretofore known such as alkaline earth titanates have the crystalline structure of the mineral perovskite and undergo a crystalline structure transition such as, for example, the transformation from a tetragonal to a cubic structure as the temperature of the material is raised through its Curie point. Once polarized, ceramics of these materials have remanent piezoelectric properties only while they are maintained in tetragonal or other crystalline state below this Curie temperature. If the internal temperature of the polarized ferroelectric ceramic is raised above this Curie point, the piezoelectric property is destroyed and the material must be reactivated by the application of a polarizing electric field before it will again exhibit remanent piezoelectric properties in its initial crystalline state below the Curie point.

Unfortunately, the Curie point of ferroelectric perovskite compounds rarely exceeds 120° C. (the Curie point of barium titanate). The utility of these ceramics as piezoelectric elements in various electromechanical transducers is thus severely curtailed by this upper temperature limitation. Where ceramic transducers are employed as compressional wave generators, for example, the maximum power output obtainable is often limited by the resultant temperature rise in the transducer. Moreover, it is often desired to employ ceramic transducers to sense mechanical vibration in locations such as on jet engines that have temperatures far above 120° C.

In my co-pending application, Serial No. 230,788, filed June 9, 1951, and assigned to the assignee of the present application, I disclose polycrystalline dielectric materials in the form of ceramics having transition temperatures much higher than perovskite ferroelectric compounds. These ceramic materials are composed principally of vitrified lead metaniobate having the general formula Pb(NbO$_3$)$_2$ which may be fluxed with an oxide of a metal selected from the group consisting of titanium and zirconium and mixtures thereof. The flux improves the mechanical strength and density of ceramic bodies formed from lead metaniobate and is therefore desirable for certain applications. As set forth in my co-pending application, ceramic dielectric materials made in accordance therewith have moderately high and fairly constant dielectric constants over a wide temperature range from normal room temperature up to temperatures of the order of 540° C. Further, the measured piezo-electric constant of these lead metaniobates is in the neighborhood of $5 \times 10^{-11}$ coulombs/newton at room temperature.

In order to impart bulk piezoelectric properties to a ferroelectric ceramic, the domains of its constituent crystals must be given a net common orientation. This is accomplished by subjecting the ceramic to an electric field gradient which at or near the Curie temperature can be relatively small. In the case of the high Curie temperature (540° C.) of fluxed lead metaniobate ceramic, however, Curie point polarization is unfeasible because of the low resistivity of the material at or near its Curie point and it is necessary to carry out the piezoelectric activation at a temperature of the order of 250° C. In this lower temperature range greater field strengths are required to overcome the high coercive force of lead metaniobate. At elevated temperatures of this order the electrical resistivity of the ceramic assumes importance since it governs the voltage which a given sample of material will sustain. For example, the polarizing voltages which may be applied to the ceramics disclosed in my co-pending application referred to previously, are limited to the order of 20 volts per mil at a temperature of the order of 250° C. beyond which field strength dielectric breakdown occurs. Under these conditions some, but not the maximum degree of activation may be realized. It is desirable, therefore, to activate piezoelectric ceramic materials of this type at as high a field strength as possible in order that maximum electro-mechanical properties may be realized.

Accordingly, a principal object of my invention is to provide a new polycrystalline dielectric material in the form of a ceramic having transition temperatures much higher than ferroelectric perovskite compounds, the ferroelectric ceramic materials of my invention having a Curie point in the neighborhood of 540° C. Another object of my invention is to provide a ceramic material polarized to exhibit remanent piezoelectric properties over a wide range of temperatures up to 540° C. An additional object of my invention is to provide a dielectric material having a moderately high and fairly constant dielectric constant over a wide temperature range from normal room temperature up to temperatures of the order of 500° C. A further object of my invention is to provide a ceramic transducer suitable for use in temperatures approaching 540° C. A still further object of my invention is to provide new polarized ferroelectric ceramic compositions of the lead metaniobate type having high piezoelectric constant values.

In accordance with my invention I have produced non-perovskite ceramic compositions of the lead metaniobate type which are ferroelectric and may be activated to exhibit higher remanent piezoelectric properties than hitherto before known for such compositions. The compositions of my invention comprise polycrystalline aggregates formed by vitrified combinations of lead oxide, niobium pentoxide, an oxide of metal selected from a first group consisting of titanium, zirconium and mixtures thereof and an oxide of a metal selected from a second group consisting of chromium, tungsten and mixtures thereof having a molar relationship between the metal ions of the aggregate which may be expressed by the general ratio of Pb:Nb$_{2-(x+y)}$:A$_x$:B$_y$. In this ratio, A represents a metal selected from the group consisting of titanium, zirconium and mixtures thereof and B represents a metal selected from the group consisting of chromium, tungsten and mixtures thereof. These ceramic compositions which may conveniently be termed modified lead metaniobates have a Curie point in the neighborhood of 540° C. and have a fairly high and flat dielectric constant from room temperature up to 500° C. as well as a moderately high piezoelectric constant of about two-thirds that of barium titanate.

As discussed in my co-pending application identified previously, lead sulfate, PbSO4, is employed as a source of lead oxide for the vitrified ceramic. The other raw materials employed are niobium pentoxide, zirconium dioxide, titanium dioxide, any suitable chromium oxide and any suitable tungsten oxide. With respect to the two later oxides, I have found chromic sesquioxide, $Cr_2O_3$, and tungsten trioxide, $WO_3$, to be satisfactory.

It is believed that the effects upon the physical properties of the basic lead metaniobate ceramic caused by the substitution of titanium, zirconium, chromium and tungsten oxides for niobium oxide is the result of these metal ions assuming the place of the replaced niobium ions in the crystal lattice. It is believed, for example, that when a lead metaniobate ceramic is made by firing lead sulfate and niobium pentoxide in the presence of small fluxing amounts of zirconium dioxide, that zirconium ions are substituted for the niobium ions in the lead metaniobate crystal lattice. The zirconium ion having four positive valence charges is substantially of the same size as the niobium ion which has five positive valence charges but carries a lower electrostatic charge. It therefore follows that every substitution of a zirconium ion for a niobium ion introduces into the crystal lattice an unsatisfied negative valence bond. It is believed that these unsatisfied bonds are responsible for ionic migration under the influence of an applied electric field and result in a lowering of the electrical resistivity of the ceramic. Use of titanium as a flux produces a similar effect upon the metaniobate lattice. I conceived that this decline in electrical properties introduced by the flux could be remedied by the simultaneous substitution for niobium ions of another metal ion with a positive valence charge of six providing the additionally substituted metal ion is substantially of the same size as the niobium ion. That is, in order to compensate for the unsatisfied valence bond introduced by each metal flux ion it is desirable that a hexavalent metal ion be provided for each quadrivalent metal flux ion. The following table illustrates the relationship of the various constituents of a few ceramics prepared according to this concept which have been successfully formed, fired and polarized.

Table I

|   | Pb | Nb | Zr | Ti | Cr | W | $k'$* | $d_{33}$** |
|---|---|---|---|---|---|---|---|---|
| A | 1.0 | 1.898 | 0.051 |   | 0.052 |   | 275 | $8.7\times10^{-11}$ |
| B | 1.0 | 1.717 | 0.105 |   |   | 0.105 | 274 | $10.1\times10^{-11}$ |
| C | 1.0 | 1.701 |   | 0.150 | 0.150 |   | 55 | $<1\times10^{-11}$ |
| D | 1.0 | 1.701 | 0.150 |   |   | 0.150 | 199 | $6.6\times10^{-11}$ |
| E | 1.0 | 1.701 |   | 0.150 |   | 0.150 | 154 | $5.8\times10^{-11}$ |
| F | 1.0 | 1.840 | 0.106 |   |   | 0.034 | 290 | $9.4\times10^{-11}$ |

*Room temperature dielectric constant.
**Piezoelectric constant in coulombs per newton.

The metal ion molar ratio of the several compositions presented in Table I are examples of typical ceramics of my invention. These metal ion molar ratios have been set forth on the basis of metal ion substitutions in the basic lead metaniobate, $Pb(NbO_3)_2$, for niobium ions, according to the previously stated ratio $$Pb:Nb_{2-(x+y)}:A_x:B_y$$

For example, the composition designated "A" in the table has a metal ion molar ratio of

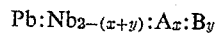

$$Pb_{1.0}:Nb_{1.898}:Zr_{0.051}:Cr_{0.052}$$

While the probable theory of compensation of unsatisfied valence bonds introduced by the A metal substitution would seem to require the substitution of an equal B metal substitution (i. e. $x=y$ in the above ratio), I have found that quite satisfactory dielectric and piezoelectric properties are obtainable even though there is a considerable excess of the A metal ion present. The set of values for the composition designated "F" in Table I are illustrative of such a ceramic. Further, B metal ions can be present in amounts up to about 50 per cent in excess of the A metal ions. Amounts in excess of this, however, result in porous ceramic bodies and, of course, dilution of the lead metaniobate in this manner tends to produce a lowering of the gross electrical properties. In view of the known behavior of titanium and zirconium oxides as fluxes for lead metaniobate, it is obvious to a person skilled in the art that piezoelectrically active lead metaniobate ceramics may be prepared according to my invention in which mixtures of titanium and zirconium oxides are substituted for either titanium or zirconium oxide and mixtures of chromium and tungsten oxides are substituted for either chromium or tungsten oxide. In view of the fact that the presence of a fluxing agent such as titanium or zirconium oxide is somewhat conditional on the use to which these materials are to be put, it may be desirable under certain circumstances to use as little of these materials as possible. For example, if density is not a necessary property, the amount of flux additions may be reduced to a minimum.

In view of the above, ceramics of my invention may be prepared from oxides according to the metal ion molar ratio $Pb:Nb_{2-(x+y)}:A_x:B_y$ in which A represents a metal selected from the group consisting of titanium and zirconium and B represents a metal selected from the group consisting of tungsten and chromium. In this ratio, $x$ and $y$ may vary between 0.001 and 0.225 when A is zirconium and B is either chromium or tungsten and when A is titanium and B is chromium, and $x$ and $y$ may vary between 0.001 and 0.150 when A is titanium and B is tungsten. However, for ceramics having better electrical and mechanical properties, $x$ and $y$ may vary between about 0.020 and 0.070, preferably about 0.045, when A is zirconium and B is chromium and when A is titanium and B is tungsten, and $x$ and $y$ may vary between about 0.50 and 0.160, preferably about 0.105, when A is zirconium and B is tungsten and when A is titanium and B is chromium.

These new materials have much higher volume resistivities at elevated temperatures than unmodified fluxed lead metaniobates and therefore permit the use of much higher electrical field strengths during activation. By way of illustration, the volume resistivity of a modified fluxed lead metaniobate ceramic, designated No. 1, made according to my invention and having a metal ion ratio of $Pb:Nb_{1.898}:Zr_{0.051}:Cr_{0.052}$ measured at several elevated temperatures is compared to the volume resistivity of a fluxed but otherwise unmodified lead metaniobate ceramic, designated No. 2, having a metal ion ratio of $Pb:Nb_{1.950}:Zr_{0.051}$ at the same temperatures, in the following table.

Table II

| Temp. (° C.) | Volume Resistivity (megohm cm.) | |
|---|---|---|
|  | 1 | 2 |
| 375 | 65.00 | 36.00 |
| 400 | 17.40 | 9.00 |
| 452 | 4.54 | 2.82 |
| 501 | 1.68 | 1.08 |

The raw materials are prepared for firing in accordance with the usual ceramic techniques. Materials are first mixed together in a liquid such as acetone or amyl acetate in which the materials are not soluble. The mixture is then dried and pulverized such as by ball milling into a fine powder so that the coarsest particles will pass a 100 mesh screen. The mixed oxide powder is then compacted into pellets for convenience in handling and the reaction between the constituent oxides accomplished by firing the pellets in an air furnace at about 1275 to 1300° C. for about one hour. The pellets of modified fluxed lead metaniobate are withdrawn from the furnace, cooled, recrushed and ball-milled to pass a 325 mesh screen. The resultant powder is then formed into the desired shape and refired. Small elements may be formed by dry pressing the powder under a pressure of about ten tons per square inch. The powder may also be admixed with a suitable binder, such as, for example, a solution of polyvinyl alcohol in water or the like, and formed by pressing, extruding or casting. The water introduced with the binding agent is then removed in any suitable fashion, for example, by heating the formed elements at about 110° C. for several hours. The dry elements are then fired in an air furnace. In order to prevent thermal stresses from causing physical damage to the formed elements, it is preferred that the firing cycle start with the furnace at or near room temperature. The temperature is increased to about 1250 to 1325° C., preferably about 1260° C. in about three to five hours, held at that temperature for about two hours, and then the ceramic elements are permitted to cool in the furnace back to room temperature. Obviously, the time necessary to fire these ceramic elements will be dependent upon their size and shape. The ultimate firing temperature is important because little or no vitrification or sintering occurs below 1250° C., and the composition melts above 1325° C.

The lead content is introduced as a sulfate to take advantage of the high (1000° C.) decomposition temperature of lead sulfate. The lead oxide PbO is thereby made available in the highly reactive state for combination with the niobium pentoxide. The rapid rise in temperature during the first firing together with the highly reactive state of the lead oxide produces a lead oxide-niobium pentoxide interaction with little opportunity for lead loss by running off or vaporization of the molten lead oxide. Only about 1 to 2 per cent of the theoretical lead oxide content is lost in the process. The firing is carried out in an oxidizing atmosphere such as provided by any air furnace which prevents the reduction of the lead metaniobate which occurs if there is an insufficiency of oxygen present.

After cooling the lead metaniobate ceramic may be piezoelectrically activated by applying a unidirectional polarizing field of at least 40 volts per mil thickness through the ceramic piece while it is maintained at a temperature within the range of 150° C. to 350° C. for a duration of at least one-half hour. Desirable conditions for piezoelectric activation are at a polarizing field of as high as 70 volts per mil thickness at 225° C. for 1 hour. Activation by applying the polarizing field while the ceramic is cooled through its Curie temperature in the manner often employed with barium titanate is impractical with the ceramics of my invention because of the too low electrical resistivity of lead metaniobate ceramics at the high Curie point (570° C.). Activation at room temperature is also impractical because the very strong polarizing fields necessary at room temperature cause breakdown of the lead metaniobate ceramic.

In making a transducer it is preferable to activate a lead metaniobate ceramic by applying the polarizing voltage to electrodes previously deposited upon opposite major faces of the ceramic piece. Pure gold or silver vacuum deposited on the face of the ceramic have been found to make satisfactory electrodes. These activating electrodes thereafter also function as the electrodes for the transducer. Commercial silvering preparations adapted to be fired onto the surface of the ceramic may also be used. In order to prevent arcing, the polarization is preferably carried out with the ceramic piece in an atmosphere of a dielectric gas at 25 to 50 pounds per square inch pressure while it is maintained at the activation temperature. Electronegative gases such, as for example, sulfur dioxide ($SO_2$), sulfur hexafluoride ($SF_6$), dichlorodifluoromethane ($CCl_2F_2$), decafluorobutane ($C_4F_{10}$), octafluoropropane ($C_3F_8$) and trifluorobromomethane ($CFBr$), among others, are dielectric gases which are suitable as a dielectric atmosphere during activation. Not only are these gases chemically inert with respect to the ceramic and to the electrode material at the temperatures and pressures used during activation, but they have a high affinity for free electrons and hence act to prevent arcs and to quench any arcs which may occur. Further, use of such a gas eliminates the necessity of removing dielectric material from the surface of the ceramic after activation, as is frequently necessary if a liquid is used. I have found sulfur hexafluoride to be an excellent atmosphere for this purpose.

The measured piezoelectric constant of lead metaniobates of my invention activated as described above is in the neighborhood of $10.1 \times 10^{-11}$ coulombs per newton at room temperature. In other words $10.1 \times 10^{-11}$ coulombs of electrical charge are produced by the ceramic body when subjected to a compressive force of one newton. The remanent piezoelectric properties of the polarized lead metaniobate ceramics appear to be retained indefinitely as long as the 540° C. Curie temperature of the material is not exceeded. Moreover, changes in temperature below 540° C. appear to have little effect upon the piezoelectric constant value. Polarized lead metaniobate pieces heated in one-half hour to 535° C. showed no change in piezoelectric constant on return to room temperature.

The improved lead metaniobate dielectric ceramics of this invention have a moderately high and only gradually increasing dielectric constant from room temperature up to approximately 500° C. For example, the ceramic identified as "B" in Table I has a room temperature dielectric constant af approximately 274 which increases with temperature approximately linearly to a value of about 600 at 300° C. The dielectric constant at 540° C., the Curie point, increases to a value of about 3000. Because of its substantially flat dielectric constant characteristic over this wide temperature range, these niobate ceramic compositions are particularly suitable for use in transducers, insulators or capacitors where a substantially uniform electrical impedance characteristic without major fluctuations is desired over the temperature range involved. The wide range of substantially flat dielectric constant versus temperature characteristics of the niobate compositions is more clearly appreciated when compared with the very narrow range of flat dielectric constant versus temperature characteristic of the alkaline earth metal titanates such as barium titanate. In this material, the flat range extends only between about 25° C. to about 80° C. with a dielectric constant of about 1200. Outside this relatively narrow range the dielectric constant varies sharply with relatively small degrees of change in temperature. The maximum dielectric constant of barium titanate occurs at its Curie point, about 120° C., and is about 6000.

From the foregoing it will be seen that the present invention provides new ferroelectric compositions suitable as dielectric materials or as piezoelectric materials in a wide variety of uses. The above specific examples in composition have been set forth as illustrative of the invention, it being understood that various modifications can be made within the true scope and spirit of my invention.

What I claim as new and desire to secure by Letters Patent of the United States is:

1. A ferroelectric ceramic composition consisting essentially of a vitrified combination of lead oxide, niobium pentoxide, an oxide of a metal selected from a first group consisting of titanium and zirconium and an oxide of a metal selected from a second group consisting of chromium and tungsten in such proportions that the metal content is in approximately the molar ratio $$Pb:Nb_{2-(x+y)}:A_x:B_y$$

wherein A and B represent a metal selected from the first and second groups, respectively, and $x$ and $y$ have a minimum value of about 0.001, a maximum value of about 0.225 when A is zirconium and B is chromium, when A is zirconium and B is tungsten, when A is titanium and B is chromium and a maximum value of about 0.150 when A is titanium and B is tungsten.

2. A ferroelectric ceramis as set forth in claim 1, in which $x$ and $y$ have a minimum value of about 0.020 and a maximum value of about 0.070 when A is zirconium and B is chromium and when A is titanium and B is tungsten, and a minimum value of about 0.050 and a maximum value of about 0.160 when A is zirconium and B is tungsten and when A is titanium and B is chromium.

3. A ferroelectric ceramic as set forth in claim 1 in which $x$ and $y$ have a value of about 0.045 when A is zirconium and B is chromium and when A is titanium and B is tungsten, and a value of about 0.105 when A is zirconium and B is tungsten and when A is titanium and B is chromium.

4. A ferroelectric ceramic composition consisting essentially of a vitrified combination of lead oxide, niobium pentoxide, zirconium oxide and chromium oxide in such proportions that the metal content is in approximately the proportion $Pb:Nb_{2-(x+y)}:Zr_x:Cr_y$ wherein $x$ and $y$ each have a minimum value of about 0.001 and a maximum value of about 0.225.

5. A ferroelectric ceramic as set forth in claim 4 in which $x$ and $y$ each have a minimum value of about 0.020 and a maximum value of about 0.070.

6. A ferroelectric ceramic as set forth in claim 4 in which $x$ and $y$ each have a value of about 0.045.

7. A ferroelectric ceramic composition consisting essentially of a vitrified combination of lead oxide, niobium pentoxide, zirconium oxide and tungsten oxide in such proportions that the metal content is in approximately the proportion $Pb:Nb_{2-(x+y)}:Zr_x:W_y$ wherein $x$ and $y$ each have a minimum value of about 0.001 and a maximum value of about 0.225.

8. A ferroelectric ceramic as set forth in claim 7 in which $x$ and $y$ each have a minimum value of about 0.050 and a maximum value of about 0.160.

9. A ferroelectric ceramic as set forth in claim 7 in which $x$ and $y$ each have a value of about 0.105.

10. A ferroelectric ceramic composition consisting essentially of a vitrified combination of lead oxide, niobium pentoxide, titanium oxide and chromium oxide in such proportions that the metal content is in approximately the proportion $Pb:Nb_{2-(x+y)}:Ti_x:Cr_y$ wherein $x$ and $y$ each have a minimum value of about 0.001 and a maximum value of about 0.225.

11. A ferroelectric ceramic as set forth in claim 10 in which $x$ and $y$ each have a minimum value of about 0.050 and a maximum value of about 0.160.

12. A ferroelectric ceramic as set forth in claim 10 in which $x$ and $y$ each have a value of about 0.105.

13. A ferroelectric ceramic composition consisting essentially of a vitrified combination of lead oxide, niobium pentoxide, titanium oxide and tungsten oxide in such proportions that the metal content is in approximately the proportion $Pb:Nb_{2-(x+y)}:Ti_x:W_y$ wherein $x$ and $y$ each have a minimum value of about 0.001 and a maximum value of about 0.150.

14. A ferroelectric ceramic as set forth in claim 13 in which $x$ and $y$ each have a minimum value of about 0.020 and a maximum value of about 0.070.

15. A ferroelectric ceramic as set forth in claim 13 in which $x$ and $y$ each have a value of about 0.045.

References Cited in the file of this patent

UNITED STATES PATENTS

| | | |
|---|---|---|
| 2,584,324 | Bousky | Feb. 5, 1952 |
| 2,598,707 | Matthias | June 3, 1952 |
| 2,646,359 | Wainer | July 21, 1953 |